No. 894,290.  
PATENTED JULY 28, 1908.  
E. C. SHAW.  
VEHICLE WHEEL RIM.  
APPLICATION FILED FEB. 20, 1907.
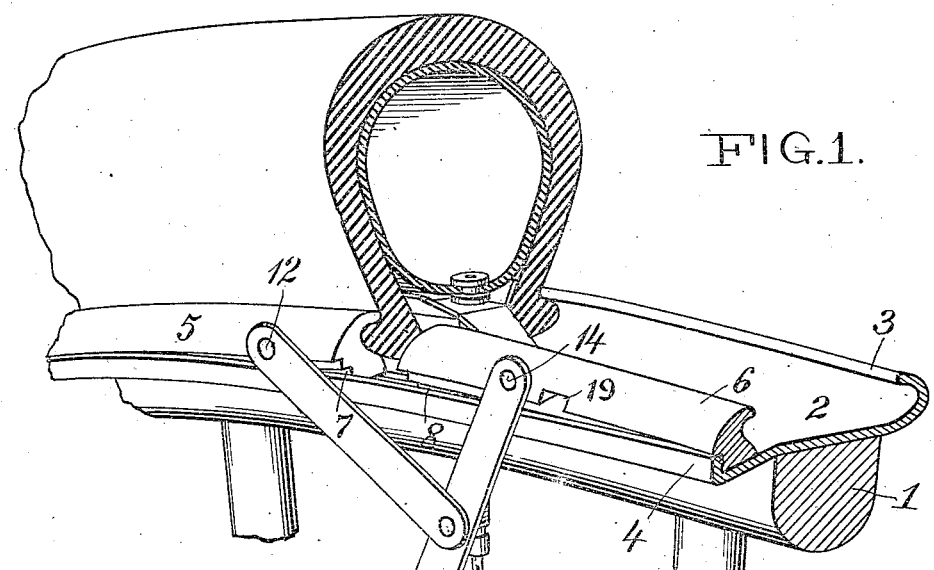
FIG.1.
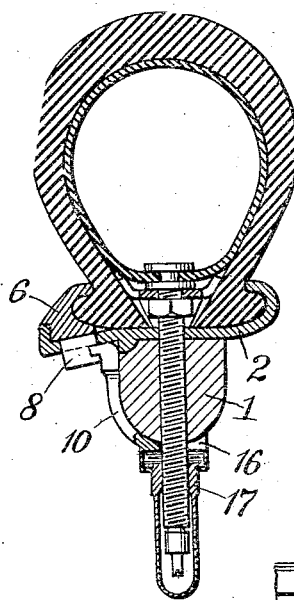
FIG.2.
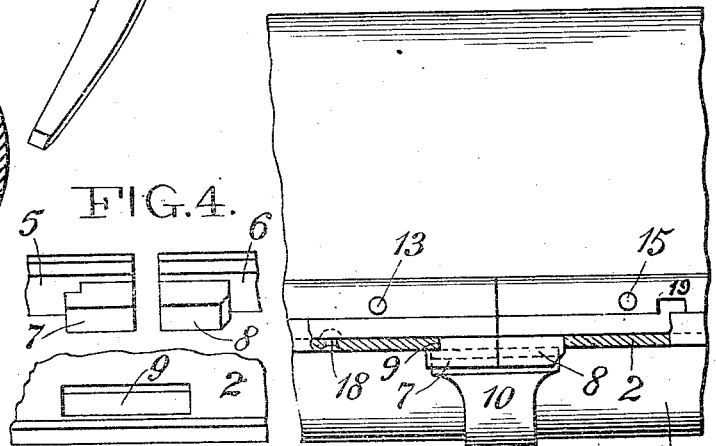
FIG.3.
FIG.4.
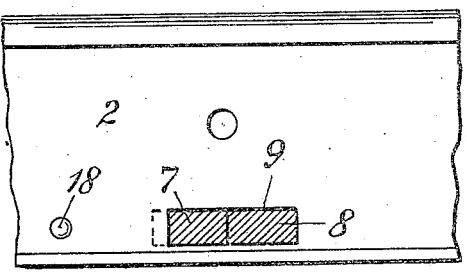
FIG.5.
WITNESSES:  
Walter F. Thompson  
Oliver Williams
INVENTOR  
Edwin Copeland Shaw  
BY Edward Davis  
ATTORNEY

UNITED STATES PATENT OFFICE.

EDWIN COUPLAND SHAW, OF AKRON, OHIO, ASSIGNOR TO B. F. GOODRICH COMPANY, OF AKRON, OHIO, A CORPORATION OF OHIO.

VEHICLE-WHEEL RIM.

No. 894,290.   Specification of Letters Patent.   Patented July 28, 1908.

Application filed February 20, 1907. Serial No. 358,459.

*To all whom it may concern:*

Be it known that I, EDWIN COUPLAND SHAW, a citizen of the United States, residing in the city of Akron, county of Summit, and State of Ohio, have invented certain new and useful Improvements in Vehicle-Wheel Rims, of which the following is a specification, reference being had to the accompanying drawings, which form a part thereof.

My invention relates to that class of vehicle wheel rims adapted for use with tires of resilient materials, and more particularly to rims intended for use with tires which can be applied and detached at will.

The form of rim commonly used comprises a channel-iron formed to provide a seat for the tire, its edges being provided with flanges of varying forms according to the style of the tire intended to be used. These flanges may be straight, outwardly curved, or may be of the form used with clencher tires, being upwardly and inwardly turned to grasp and hold beads formed upon the tire. These tire flanges are usually made integral with the rim, in which case the circumferential distance about the extremity of the flanges is considerably greater than the distance about the portion of the channel-iron against which the tire seats, and to apply the tire or the tire-casing it must be greatly stretched and materials must be used which are capable of such stretching; or the length of the tire must be made greater than the circumference of the channel-iron requires and some means devised for subsequent tightening.

In my improved rim one tire flange is formed upon a detachable transversely split ring, means being provided for locking said ring to the periphery of the rim.

The object of my invention is to provide a rim which will facilitate the attachment and removal of the tires and prevent stretching of and consequent damage to the materials composing them, difficulties necessarily incident to the use of the present styles of rim.

A further object of my invention is to provide a rim which will permit the use of non-extensible or non-stretchable tires.

I am aware that wheel rims have been constructed with detachable tire flanges, but the methods of and means for securing the detachable flanges to the rims have been unsatisfactory with regard both to ease of application and to security of attachment; so unsatisfactory, in fact, as to prevent the use of such rims upon modern automobiles and upon vehicles intended for heavy traction work. I have therefore devised and believe to be new the structure hereinafter described.

Referring to the drawings, Figure 1 is a perspective view of my device showing a section of the tire and my improved means for attaching the tire to the rim. Fig. 2 is a cross-section showing the means for locking the detachable flange in place. Fig. 3 is a side view of the tire and rim showing the details of construction. Fig. 4 is a perspective view of the terminals of the split ring, the lugs thereon and the slot in the rim designed to receive said lugs. Fig. 5 is a plan view of a section of the rim showing the slot for the admission of the lugs and the position of the lugs in the slot.

I have shown a particular form of my improved rim designed for use with clencher tires, but it will be obvious to those skilled in the art that the form of the rim flange can be varied at will to permit the use of any style of tire.

In Fig. 1, 1 is the felly of the wheel to which is affixed the rim or channel-iron 2. Formed upon or permanently fixed to this rim is the tire flange 3. At its other edge the rim is extended some distance laterally and the part projecting beyond the felly preferably has a slight tendency downwardly toward the hub of the wheel. This edge terminates in the upturned flange 4 extending the entire length of the rim, being designed to form a seat for the removable ring 5 and to secure it from lateral displacement. The form of this portion of the rim may of course be varied considerably; for example, it may have a downwardly disposed offset instead of the inclined part, but the essential feature is that the upper edge of the retaining flange must be on a level with or below the surface of the main portion of the channel-iron in order to permit the tire to be slipped over it without stretching. The shape of the retaining flange is likewise immaterial, except that the flange or its equivalent must act as a seat for the removable ring and secure it from laterally outward movement.

The ring 5 is transversely split at one point, its terminals being adapted to fit closely against one another. It comprises a tire flange 6 and a base portion which is flattened and beveled so that when it rests upon the extension of the rim and seats against the flange 4, the tire flange 6 is in position to retain the tire. Upon the underside of the terminals of this removable ring are formed or fixed the lugs 7 and 8, formed to fit accurately into the slot 9 in the channel-iron. The upper portion of the posterior face of the lug 7 is cut back to form a recess, having a vertical depth equal to the thickness of the channel-iron, thus forming upon the lug a hook for the purposes hereinafter shown. The lug 8 preferably has its posterior edge slightly beveled to enable it to be more easily inserted in the slot. The slot 9 has a width equal to the common width of these two lugs and a length equal to their combined length, exclusive of the projection formed upon the hooked lug. The faces of these lugs adjoining the wheel felly are provided with a continuous longitudinal groove adapted to engage with the hook or flange at the extremity of the locking clamp 10. This locking clamp is preferably shaped to fit closely against the felly and is provided at its lower extremity with some means for attaching it thereto. This attachment may be made in any suitable manner; for example, the extremity of the clamp may be drilled to receive a pin, bolt or thumb-screw adapted to be forced into the wheel felly. In the drawings, however, I have shown a form which I prefer to use with pneumatic tires, in which the lower extremity of this clamp is provided with a fork or bifurcation 16 of suitable size to embrace the stem of the inflating valve. The usual form of dust-cap 17 can then be screwed up against the fork, securing it firmly in position. If this structure is used the center of the rim slot must be directly opposite the hole in the rim and felly designed for the admission of the valve stem.

I find it of great assistance in accurately adjusting the removable ring to provide the channel-iron with two or more very small dowels 18 registering with corresponding depressions in the ring. For this purpose a small round headed rivet driven through the channel-iron answers the purpose admirably, a corresponding depression being cast or punched in the ring.

The operation of my device is as follows: To attach a tire the split ring is removed, the tire applied to the rim and made to engage closely with the permanent tire flange about the entire periphery of the wheel. The split ring is then applied, the lug 7 being hooked into the slot, the locking clamp being withdrawn. The ring is then sprung into place about the wheel, its base being fitted against the straight flange 4, the lug 8 entering the unoccupied portion of the slot. The hook of the locking clamp is then inserted in the groove of the lugs, forced back into position against the felly and locked there by means of the dust-cap, whereupon the tire is solidly attached to the rim. The seating flange 4 prevents lateral displacement of the split ring. The lugs 7 and 8 prevent any creeping or movement of the ring about the periphery of the rim, and the hook upon the lug 7 and the locking clamp 10 engaged within the groove upon the lugs hold the terminals of the ring firmly against the channel-iron.

To remove the tire the mode of operation is reversed. The dust-cap is removed, the locking clamp is pulled outward, disengaging its hook from the grooves in the lugs, whereupon the plain lug can be easily sprung out from the slot and the whole ring and the tire removed. If desired both tire flanges may be made detachable by simply duplicating the removable split ring and the attaching means. In practice however such a construction is found to be unnecessary and undesirable. Again, the removable ring may be constructed in two or more parts by providing similar locking means at its various joints and with unusually heavy vehicles this may be found advantageous.

In adjusting the ring it is sometimes found difficult to bring the terminals together in order to insert the plain lug in the slot. To enable this to be done more easily I prefer to use the jointed lever 11, the operation of which is as follows: The hooked lug is inserted in the slot, the ring sprung into place about the rim, the pin 12 inserted in the hole 13 drilled in the split ring, the pin 14 inserted in the hole 15 drilled in the other terminal of the ring, when, by means of the lever, the terminals can be made to approach closely, allowing the plain lug to be forced into the slot.

In practice the plain lug sometimes binds within the slot, even after the clamp has been removed, and to enable this terminal of the split ring to be forced upward, I provide in the split ring near the terminal bearing the plain lug a small slot or channel 19, the edge of which projects slightly above the flange 4. The end of the lever 11 or a screw driver or other suitable tool can be inserted in this slot and the ring terminal easily pried upward.

Having described my invention, what I claim is:

1. In a vehicle wheel rim the combination of a channel-iron, a slot in said channel-iron, a removable flange mounted upon a transversely split ring carrying lugs adapted to fit within said slot in normal tension resisting engagement with the end walls thereof, and a locking clamp adapted to engage said lugs and to hold them within said slot.

2. In a vehicle wheel rim the combination of a channel-iron, a permanent flange mounted thereon, a removable flange mounted upon a transversely split ring, lugs upon the terminals of said ring adapted to fit within a slot within said channel-iron, and a locking clamp having one terminal formed to engage within a groove in said lugs and its other terminal adapted to be attached to the felly of the wheel.

3. In a vehicle wheel rim the combination of a channel-iron, a permanent flange thereon, a removable flange carried upon a split ring, and means for holding said split ring to said channel-iron, comprising a retaining flange upon said channel-iron, a plain lug upon one terminal of said split ring, and a hooked lug upon the other terminal, said lugs adapted to fit within a slot in said channel-iron, and a locking clamp having at one end a hook for engagement with a groove in said lugs, and at the other end means for attachment to the wheel felly.

4. In a vehicle wheel rim means for retaining a removable flange upon a channel-iron, comprising lugs at the terminals of said removable flange, a slot in the channel-iron adapted to receive said lugs, and a locking clamp constructed to engage said lugs and the wheel felly to secure them within said slot and to the felly of the wheel.

5. In a vehicle wheel rim means for attaching a removable flange to a channel-iron, comprising a retaining flange upon said channel-iron, lugs at the terminals of said removable flange, a slot in said channel-iron adapted to receive said lugs and a locking clamp having one terminal adapted to engage in a groove in said lugs, its other terminal engaging with the wheel felly.

6. In a vehicle wheel rim, the combination of a channel-iron having a permanent flange thereon, a removable flange mounted upon a transversely split ring, lugs upon said split ring adapted to fit within a slot in the channel-iron, a retaining flange upon said channel-iron adapted to secure the removable flange against lateral displacement, a groove in said lugs, and a locking piece adapted to engage with said groove and to be secured to the wheel felly.

7. In a vehicle wheel rim, means for locking a removable flange to a channel-iron, comprising a hooked lug upon one terminal of said flange, and a plain lug at the other terminal of said flange, a slot in the channel-iron adapted to receive said lugs, and a locking piece adapted to engage a groove in said lugs and to be secured to the wheel felly.

8. In a two-part vehicle wheel rim, the combination of a channel-iron having a permanent flange thereon, a second flange mounted upon a transversely split ring, downwardly extending lugs upon the base of the terminals of said ring, a continuous groove in the inner faces of said lugs, and a locking clamp having a hook at one terminal adapted to engage said groove, and its other terminal provided with means for attachment to the wheel felly.

9. Means for locking the segments of a detachable tire flange to the channel-iron of a vehicle wheel rim, comprising lugs upon the terminals of said segments, slots in the channel-iron adapted to receive said lugs and a locking clamp adapted to engage a groove in said lugs and be secured to the wheel felly.

10. In a two-part rim for vehicle wheels the combination of a channel-iron 2, a permanent tire flange 3, a tire flange 6 mounted upon a split ring 5, a hooked lug 7, and a plain lug 8 mounted upon the under surface of the ring terminals, a slot 9 in the said channel-iron, a locking clamp 10, provided at one end with a hook adapted to engage in a groove in said lugs, and at the other with means for attachment to the wheel felly.

11. In a wheel rim a tire seating member, a slot in said member, a split removable tire retaining flange carrying lugs at its ends adapted to fit within said slot, one of said lugs having its posterior face provided with an under-cut recess forming a hook, the length of the slot being equal to the combined length of the lugs at the base of the under-cut recess.

12. In a wheel rim a tire seating member, a slot in said member, a split removable tire retaining flange carrying lugs at its ends, said lugs adapted to enter said slot and completely fill the same.

13. In a wheel rim a tire seating member, a slot in said member, a split removable tire retaining flange carrying lugs at its ends, the combined length of said lugs being equal to the length of the slot.

EDWIN COUPLAND SHAW.

Witnesses:
C. C. GOODRICH,
W. K. MEANS.